US007903852B2

(12) United States Patent
Springorum et al.

(10) Patent No.: US 7,903,852 B2
(45) Date of Patent: Mar. 8, 2011

(54) AUTOMATIC DETERMINATION OF PARAMETERS OF AN IMAGING GEOMETRY (75) Inventors: Rudolf Springorum, Eindhoven (NL); Kirsten Meetz, Hamburg (DE); Frederik Visser, Eindhoven (NL); Daniel Bystrov, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 984 days.

(21) Appl. No.: 11/572,710

(22) PCT Filed: Jul. 19, 2005

(86) PCT No.: PCT/IB2005/052404
§ 371 (c)(1),
(2), (4) Date: Jan. 26, 2007

(87) PCT Pub. No.: WO2006/013499
PCT Pub. Date: Feb. 9, 2006

(65) Prior Publication Data
US 2008/0267509 A1 Oct. 30, 2008

(30) Foreign Application Priority Data
Jul. 27, 2004 (EP) .................... 04103581

(51) Int. Cl.
*G06K 9/00* (2006.01)
(52) U.S. Cl. .................................. 382/128
(58) Field of Classification Search .......... 382/128–134; 128/920–928; 250/455–460; 356/39–49; 600/407–414, 424–426
See application file for complete search history.

(56) References Cited

U.S. PATENT DOCUMENTS

| 5,457,724 | A | * | 10/1995 | Toth .............................. 378/4 |
| 5,512,827 | A |  | 4/1996 | Hardy et al. |
| 6,275,721 | B1 |  | 8/2001 | Darrow et al. |
| 6,492,812 | B1 |  | 12/2002 | Debbins et al. |
| 2002/0081009 | A1 |  | 6/2002 | Licato et al. |
| 2002/0156359 | A1 |  | 10/2002 | Knoplioch et al. |

FOREIGN PATENT DOCUMENTS

EP 1220153 A2 7/2002

OTHER PUBLICATIONS

Jackson, C., et al.; Automatic Planning of the Acquisition of Cardiac MR Images; 2003; LNCS; vol. 2878; pp. 541-548.
Lelieveldt, B. P. F., et al.; Automated Observer-independent Acquisition of Cardiac Short-Axis MR Images: A Pilot Study; 2001; Radiology; 221(2)537-542.
Sun, C.; Symmetry detection using gradient information; 1995; Pattern Recognition Letters; 16(9)987-996.
Wagemans, J.; Characteristics and models of human symmetry detection; 1997; Trends in Cognitive Sciences; 1(9) 346-352.

\* cited by examiner

*Primary Examiner* — Samir A Ahmed
*Assistant Examiner* — Atiba O. Fitzpatrick (57) ABSTRACT

The apparatus comprises an input for receiving a suitable source image data of an object. The core of the apparatus is formed by a control unit 4 arranged to load image data from the input and determine a spatial position and orientation of a portion of the object and to automatically calculate actual parameters of the imaging geometry based on said position and orientation and using default parameters if the imaging geometry, selected by the control unit in accordance with the portion of the object. The apparatus according to the invention comprises a recognition module arranged to determine a spatial position and orientation of the portion of the object with respect to a coordinate system of an imaging apparatus conceived to use the actual parameters of the imaging geometry provided by the apparatus.

5 Claims, 6 Drawing Sheets

AUTOMATIC DETERMINATION OF PARAMETERS OF AN IMAGING GEOMETRY

The invention relates to an apparatus arranged to determine actual parameters of an imaging geometry conceived to be used by a data acquisition module for acquisition of image data of a portion of an object.

The invention further relates to an imaging system.

The invention still further relates to a method of automatically generating a scan geometry for a data acquisition module for obtaining a scan data of a portion of an object.

The invention still further relates to a computer program.

An embodiment of a diagnostic apparatus as is set forth in the opening paragraph is known from U.S. Pat. No. 6,492,812. The known diagnostic apparatus is arranged to define a scan geometry based on a pre-stored geometry information, notably from a previous scan of the same object, and to subsequently manipulate the geometry information for defining the parameters of the scan geometry for a next scan of the object. For this purpose the known diagnostic apparatus comprises user interface arranged to enable a user to interact with the pre-stored geometry information. The geometry information comprises geometry coordinates defining the location of a planar section of the portion of the object in the imaging volume with reference to the patient right-left direction, patient anterior-posterior direction and patient superior-inferior direction. The user may then validate the parameters of the scan geometry by acquiring real-time scan data corresponding to the boundaries of the scanning region.

It is a disadvantage of the known diagnostic apparatus that in order to define the parameters of the scan geometry for a new scan, a user interaction is required. It is generally acknowledged, especially in the field of medical imaging, that user dependencies during the planning of the scan geometry lead to inconsistencies of positioning of the slices with respect to the target volume, which may be unacceptable.

It is an object of the invention to provide a diagnostic apparatus whereby the determination of the parameters of the scan geometry is automated.

To this end the diagnostic apparatus according to the invention comprises a control unit arranged to select default parameters of the imaging geometry with reference to a coordinate system of the data acquisition module, and a recognition module arranged to determine a spatial position and orientation of the portion of the object with respect to said coordinate system, the control unit being further arranged to automatically calculate the actual parameters of the imaging geometry based on the default parameters of the imaging geometry and the spatial position and orientation of the portion of the object.

The technical measure of the invention is based on the insight that when the imaging geometry and the position and orientation of the portion of the object conceived to be imaged are defined in the coordinate system of the data acquisition unit, it is possible to automate the scan planning. The automation comprises a suitable transformation of default parameters of the imaging geometry defined for a default target, for the actual target defined by the established position and orientation of the portion of the object.

Preferably, default parameters of the imaging geometry describe a set of slices mapped on a virtual object, notably on an anatomy of a patient represented in a suitable source image. Preferably, a survey scan is used for the source image. The parameters of the imaging geometry comprise the description of, for example scan plane coordinates and angulations relative to the coordinate system of the data acquisition module. Various embodiments of the data acquisition module are contemplated, including, but not limited to a magnetic resonance unit, a computer tomography unit, a gamma camera, an ultrasound unit, etc. Preferably, an iso-center of the data acquisition unit is used as a reference point within the coordinate system. When the portion of the object is recognized in the source image and its position and orientation with respect to the coordinate system of the data acquisition unit is established, the control unit of the apparatus according to the invention calculates the actual parameters of the imaging geometry from the default parameters of the imaging geometry and the coordinates of the portion of the object under consideration.

Preferably, the recognition unit is arranged to automatically recognize the portion conceived to be imaged in the source image. For example, the recognition unit may be arranged to segment a particular shape, for example corresponding to a human organ. Various per se known image segmentation techniques may be used for this purpose. Alternatively, the recognition unit may be arranged to delineate the portion, for example based on selected pixel values. In this case, lung, bones, or areas corresponding to a distinct variation in the pixel value may easily be recognized. When the portion is recognized, its position and orientation with respect to the coordinate system of the data acquisition unit may easily be established. The information about the coordinate system of the data acquisition module can be obtained from the source image, provided it is acquired using the envisaged data acquisition module. Alternatively, the information about the coordinate system of the data acquisition module may be obtained from a suitable file stored, for example in a suitable storage unit of the apparatus according to the invention.

In an embodiment of the apparatus according to the invention the recognition module is further arranged to define an object-related coordinate system based on symmetry properties of the object, the spatial position and orientation of the portion of the object being determined from a position and an orientation of the object-related coordinate system.

The technical measure of this embodiment is based on the insight that in many occasions planning of the imaging geometry yielding suitable parameters thereof is carried out using a bounding box, whereby the region of interest of the object and its orientation are deduced from the position and the orientation of the bounding box. It is a common practice to define the bounding box manually, which is disadvantageous as the manual operation is prone to errors and is time consuming. It is considered to be advantageous to use the intrinsic symmetry properties of the object under consideration, notably of a patient, to automatically position the bonding box.

For this purpose the recognition unit of the apparatus according to the invention is arranged to use the symmetry properties of the object, for example expressed in symmetry axes and/or symmetry planes. This feature is based on an observation that particularly the human anatomy is symmetrical with respect to a saggital axis observable with respect to paired organs, like lungs, kidneys, eyes, brain, etc. Preferably, to construct the symmetry axes and/or the symmetry planes, the recognition unit carries out the steps of constructing a mirrored image with respect to an original image of the patient, calculating a cross-correlation between these images resulting in an establishment of a position of the symmetry axes and/or the symmetry planes. The intersection of the symmetry axes and/or symmetry planes yields an origin of the object-related coordinate system. The reference points determining the position and the orientation of the resulting bounding box are automatically positioned, for example on a surface of the object in accordance with respective intersections of the symmetry axes/symmetry planes with the surface of the object.

In a further embodiment of the apparatus according to the invention, the apparatus further comprises a user interface arranged to enable an adjustment of the actual parameters of the imaging geometry by a user.

It is found to be advantageous to allow the user to modify the setting of the automatically generated parameters of the imaging geometry. For medical applications, this is particularly advantageous, as some internal changes of the object may occur between the instances the default parameters were established and the instance a new acquisition of the image data may be required. In case when the default parameters are used for an automatic planning of the imaging geometry for a different object, notably a patient, there is a possibility that the scan planes have to be modified, for example not to intercept critical areas. In case the user has adjusted the parameters of the imaging geometry, the adjusted parameters are preferably stored and are subsequently made available to the data acquisition module.

In a still further embodiment of the diagnostic apparatus according to the invention, wherein a plurality of the adjusted actual parameters is stored, the control unit is further arranged to adapt the actual parameters of the scan geometry in accordance with said plurality of the adjusted actual parameters.

According to this technical measure, the control unit is arranged to overrule the automatically determined actual parameters of the imaging geometry by the adjusted parameters for planning of the new scan. This technical measure ensures a quality control of the automatic planning procedure, enabling the apparatus according to the invention to explore user's expertise to modify the automatically defined prescription accordingly, if required.

In a still further embodiment of the diagnostic apparatus according to the invention the recognition module is further arranged to generate shape parameters of the portion of the object, the control unit being further arranged to modify the actual parameters of the imaging geometry in accordance with the shape parameters.

It is found to be particularly advantageous to automate a process of coping with different shapes of frequently used portions of the object, notably different shapes of similar organs in different humans. For this purpose, preferably, the recognition unit is arranged to calculate parameters indicative of a size (left-right, cranial-caudal, anterior-posterior) and/or shape (round, square, rectangular). These shape parameters could be used to discriminate between differently sized and shaped similar organs, like hearts, brains, lungs, etc. According to this technical measure, the automatically generated actual parameters not only take into account the position and orientation of the portion in space, but also use suitable information on its shape, further improving the accuracy of the automated planning of the imaging geometry.

In a still further embodiment of the diagnostic apparatus according to the invention for a new shape the control unit is further arranged to assign weighting factors to different stored actual parameters representative of different shapes, based on a degree of conformity of respective shapes to a new shape, and to calculate the actual parameters for the new shape by using weighted plurality of stored actual parameters of the imaging geometry.

It is possible that the storage unit of the apparatus contains a plurality of the actual parameters of the imaging geometry assigned, for example for the same type of organ, but for differently shaped organs. In this case, the control unit is arranged to weight these actual parameters, whereby parameters corresponding to the most similar shape is weighted higher than those of a shape considerably different to the shape of the organ under consideration. According to this technical measure the apparatus is arranged to use the expertise of a plurality of pre-stored actual parameters, still further improving the reliability of the automated planning of the imaging geometry.

It is a further object of the invention to provide a method for an automated planning of parameters of the imaging geometry.

The method according to the invention comprises the following steps:

selecting default parameters of an imaging geometry with reference to a coordinate system of a data acquisition module;

determining a spatial position and orientation of the portion of the object with respect to said coordinate system;

calculating the actual parameters of the imaging geometry based on the default parameters of the imaging geometry and the spatial position and orientation of the portion of the object.

According to the method of the invention an automatic prescription of, for example the scanning planes is enabled thus reducing planning errors and inconsistencies due to a human factor. Also, it is a further advantage of the method according to the invention that the method may be implemented in a background or as a batch-job, considerably improving the work-flow, as no time is lost by the user to plan the imaging geometries. Preferably, prior to the implementation of a data acquisition step, the user validates the automatically generated parameters of each automatically established imaging geometry. Further advantageous embodiments of the method according to the invention are set forth in claims 8-11.

The computer program according to the invention is arranged to comprise suitable instructions to cause a processor to carry out the steps of the method as are set forth in the foregoing.

These and other aspects of the invention will be described in further details with reference to figures.

Figure 1:
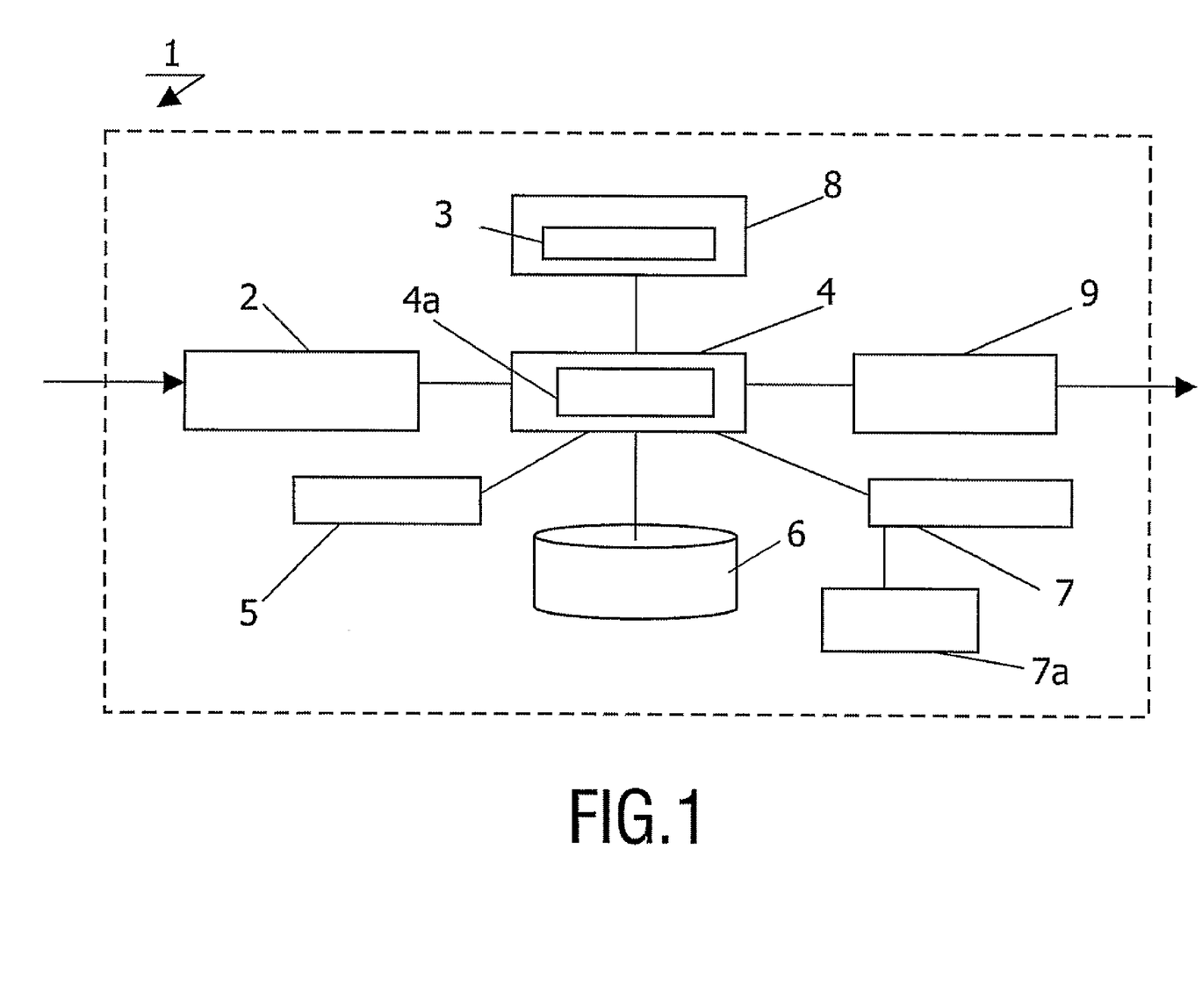
FIG. 1 presents a schematic view of an embodiment of the apparatus according to the invention.

FIG. 1 presents a schematic view of an embodiment of the apparatus according to the invention. The apparatus 1 comprises an input 2 for receiving a suitable source image data of an object, notably a survey scan of a patient, in any suitable form. For example, the apparatus 1 may be involved in the acquisition of the source image data. In this case the image data may be acquired in an analogue form and converted using a suitable A/D converter to a digital form for further processing. The image data may also be received in a digital form, e.g. through direct acquisition in a digital form or via a computer network after having been acquired by a remote computer/medical instrument. The core of the apparatus 1 is formed by a control unit 4 which is arranged to load image data from the input 2 and determine a spatial position and orientation of a portion of the object and to automatically calculate actual parameters 4a of the imaging geometry based on said position and orientation and using default parameters if the imaging geometry, selected by the control unit 4 in accordance with the portion of the object. For this purpose the apparatus 1 comprises a storage unit 8 arranged to store at least one set of default parameters of the imaging geometry, which may be representative of an imaging protocol, for example of a particular human organ or a particular region of interest within the patient. The set of default parameters of the imaging geometry are preferably previously defined and are selectable by the control unit 4. The default parameters of the imaging geometry are preferably structured as a database, structured according to a parameter, like a type of an imaging protocol. A suitable example of a storage unit is a background storage, typically based on a hard disk. The apparatus 1 further comprises a working memory 6, typically based on RAM. The storage unit 8 can be used for storing the image data (or parts of it) when not being processed, and for storing operations on the image data and on the default parameters of the imaging geometry. The working memory 6 typically holds the (parts of) image data being processed and the instructions for the suitable image processing means used for processing those parts of the image data. The apparatus 1 according to the invention comprises a recognition module 7 arranged to determine a spatial position and orientation of the portion of the object with respect to a coordinate system of an imaging apparatus conceived to use the actual parameters of the imaging geometry provided by the apparatus 1. It is possible that suitable references to a plurality of coordinate systems, representative of a plurality of different imaging apparatuses is made. Such different coordinate systems are preferably stored in the storage unit 8. In order to determine the spatial position and orientation 7a of the portion of the object, the recognition unit 7 may utilize a suitable image segmentation algorithm arranged first to delineate a region of interest, for example based on pixel values of the image, and, secondly to calculate the position and the orientation of the portion of the object with respect to the coordinate system of a suitable data acquisition module selected from the storage unit 8, or obtained directly from the source image. When the position and orientation 7a of the portion of the object with respect to the coordinate system of the data acquisition module is established, the control unit calculates actual parameters 4 of the imaging geometry based on a suitable matching between the spatial position and orientation 7a of the portion of the object conceived to be imaged and the default parameters of the imaging geometry 3. The step of matching typically comprises calculating suitable rotations and/and or displacements of the default imaging planes as described by the default imaging parameters so that their spatial position and orientation matches the position and orientation of the portion of the object.

Preferably, the apparatus 1 further comprises a suitably arranged user interface 5 for allowing an adjustment of automatically established actual parameters of the imaging geometry by a user. Preferably, such adjustment is carried out using a suitable graphic representation of the resulting imaging planes, whereby the user operates a suitable pointing device to displace the resulting imaging planes with respect to the portion of the object. The control unit 4 updates the actual parameters of the imaging geometry accordingly.

Preferably, the output 9 comprises a result of the automatic planning of the imaging geometry, which may be directly converted into a suitable control signal for the data acquisition module and/or be made available in a suitable form for archiving purposes. Preferably, a geometric representation of the automatically determined imaging geometry is stored in a suitable file.

Figure 2:
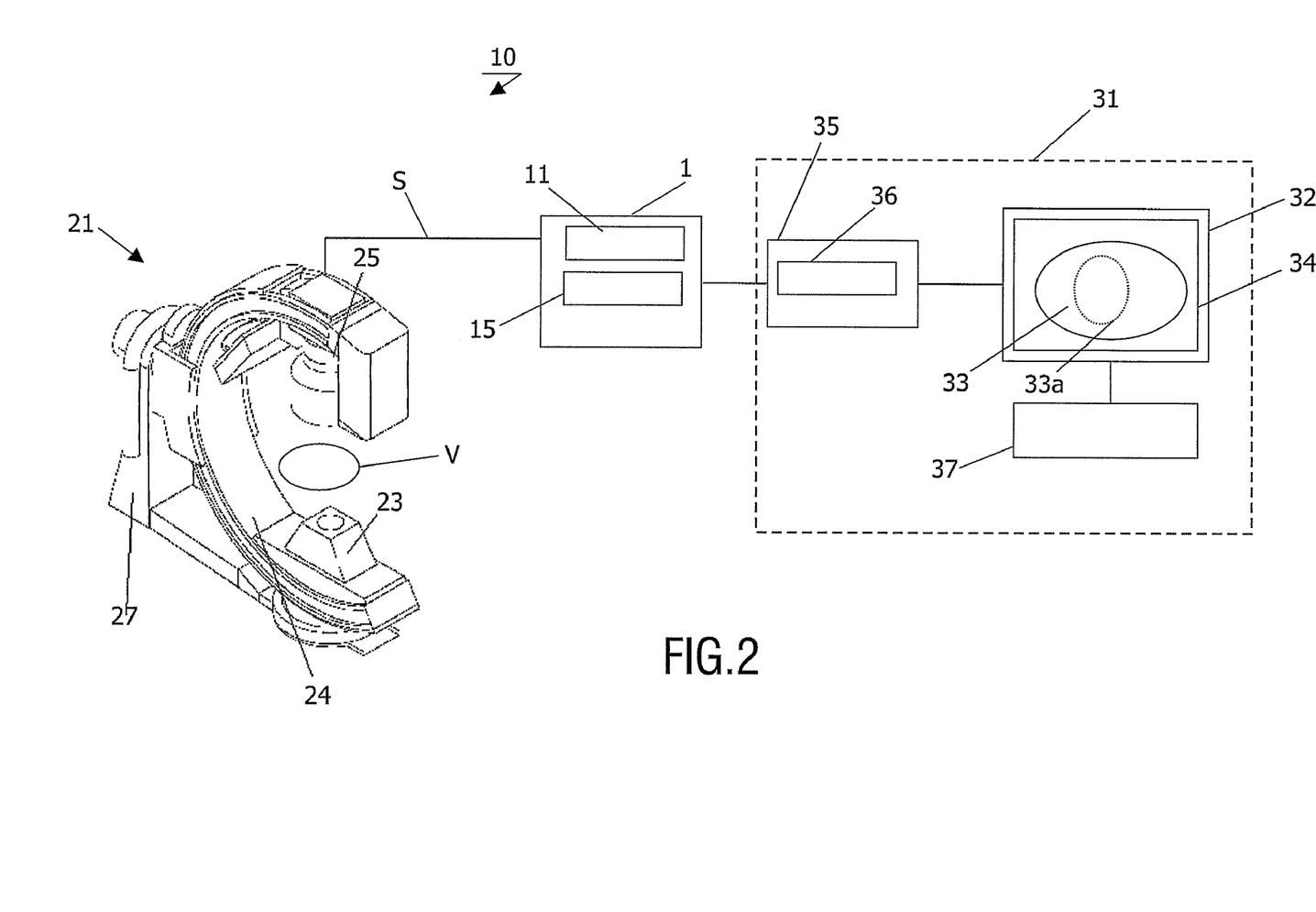
FIG. 2 presents in a schematic way an embodiment of the imaging system according to the invention.

FIG. 2 presents in a schematic way an embodiment of the imaging system according to the invention. The imaging system 10 according to the invention comprises the apparatus 1 arranged for an automatic determination of an imaging geometry conceived to be used by a data acquisition module. Preferably, the operation of the apparatus 1, as is described with reference to FIG. 1, is controlled by means of a suitable computer program 11. The output of the apparatus 1 preferably comprises a suitable control signal S applicable to the acquisition module 21. The imaging system 10 according to the invention further comprises a data acquisition unit 21. Although in this example an X-ray device is shown, other data acquisition modalities, like a CT, a magnetic resonance apparatus or an ultra-sound device are contemplated as well. The X-ray apparatus is arranged to acquire image data of an object, for example a patient, suitably positioned and irradiated in an acquisition volume V of the apparatus 21 in accordance with the imaging geometry as defined by the apparatus 1 and provided by the control signal S. For purposes of the data acquisition, a beam of X-rays (not shown) is emitted from the X-ray source 23. The transmitted radiation (not shown) is registered by a suitable detector 25. In order to enable an oblique imaging, the X-ray source 23 and the X-ray detector 25 are mounted on a gantry 24 which is rotatably connected to a stand 27. A signal (not shown) at the output of the X-ray detector 25 is representative of the thus acquired image data 15.

The image data 15 from the apparatus 1 is preferably made available to the further input 35 of a suitable viewer 31. Preferably, the further input 35 comprises a suitable processor arranged to operate a suitable interface using a program 36 adapted to control the user interface 34 so that an image 33 representative of the portion of the is visualized. The image 33 may be visualized as a single two-dimensional image, or a series of two-dimensional images, or, alternatively, a three-dimensional image. Preferably, for user's convenience, the viewer 31 is provided with a high-resolution display 32, the user interface being operable by means of a suitable input device 37, for example a mouse, a keyboard or any other suitable user's input device.

Figure 3A:
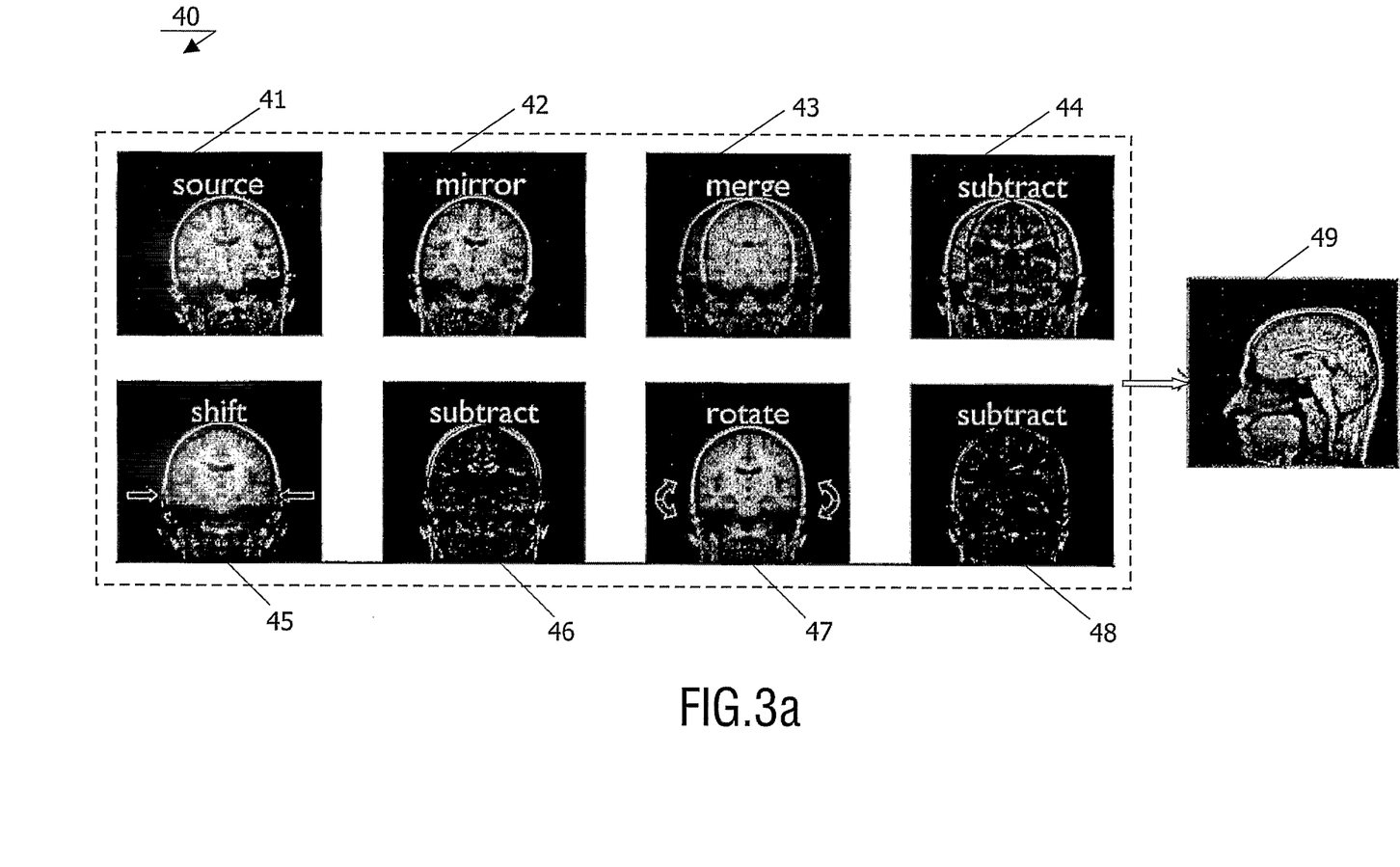
FIG. 3a presents in a schematic way an embodiment of an operation of the recognition unit.

FIG. 3a presents in a schematic way an embodiment of an operation of the recognition unit. An embodiment 40 of the operation of the recognition unit is arranged to automatically determine the position and the orientation of the portion of the object with respect to the coordinate system of the data acquisition module envisaged to carry out the imaging step. For this purpose at step 41 the recognition unit selects a source image of the object, notably of a patient, said image being representative of a region of interest conceived to be subsequently imaged. At step 42 the recognition unit computes a mirrored image, which is used at step 43 to merge with the source image 41. During subsequent steps 44, 45, 46, 47,48 the source image and its mirrored image are subtracted, shifted with respect to each other, rotated, for a suitable number of iterations yielding a resulting image 49, which is representative of a plane of symmetry in a chosen direction. The image manipulations necessary to arrive at the plane of symmetry are logged as they represent the position and the orientation of the region of interest with respect to the coordinate system of the data acquisition module. Preferably, the source image is acquired with the same data acquisition module as is envisaged for a subsequent imaging. In this case the coordinates of the source image 41 are representative of the coordinate system of the data acquisition module. Alternatively, a transformation of the coordinate system of the data acquisition module of the source image 41 is necessary to arrive at the coordinate system of the envisaged data acquisition module. In this case the coordinate system of the envisage data acquisition module is stored in look-up table and is accessible by the control unit of the apparatus according to the invention. In this example a saggital viewing is selected by way of an example. In general, saggital, coronal and three-dimensional source images can be used for constructing corresponding planes of symmetry for the region of interest. The position and orientation of the region of interest in the resulting image 49 is made available to the control unit of the apparatus according to the invention to calculate the actual parameters of the imaging geometry. Although this particular embodiment shows a human brain, other organs and/or portions of a human body may be selected as well.

Figure 3B:
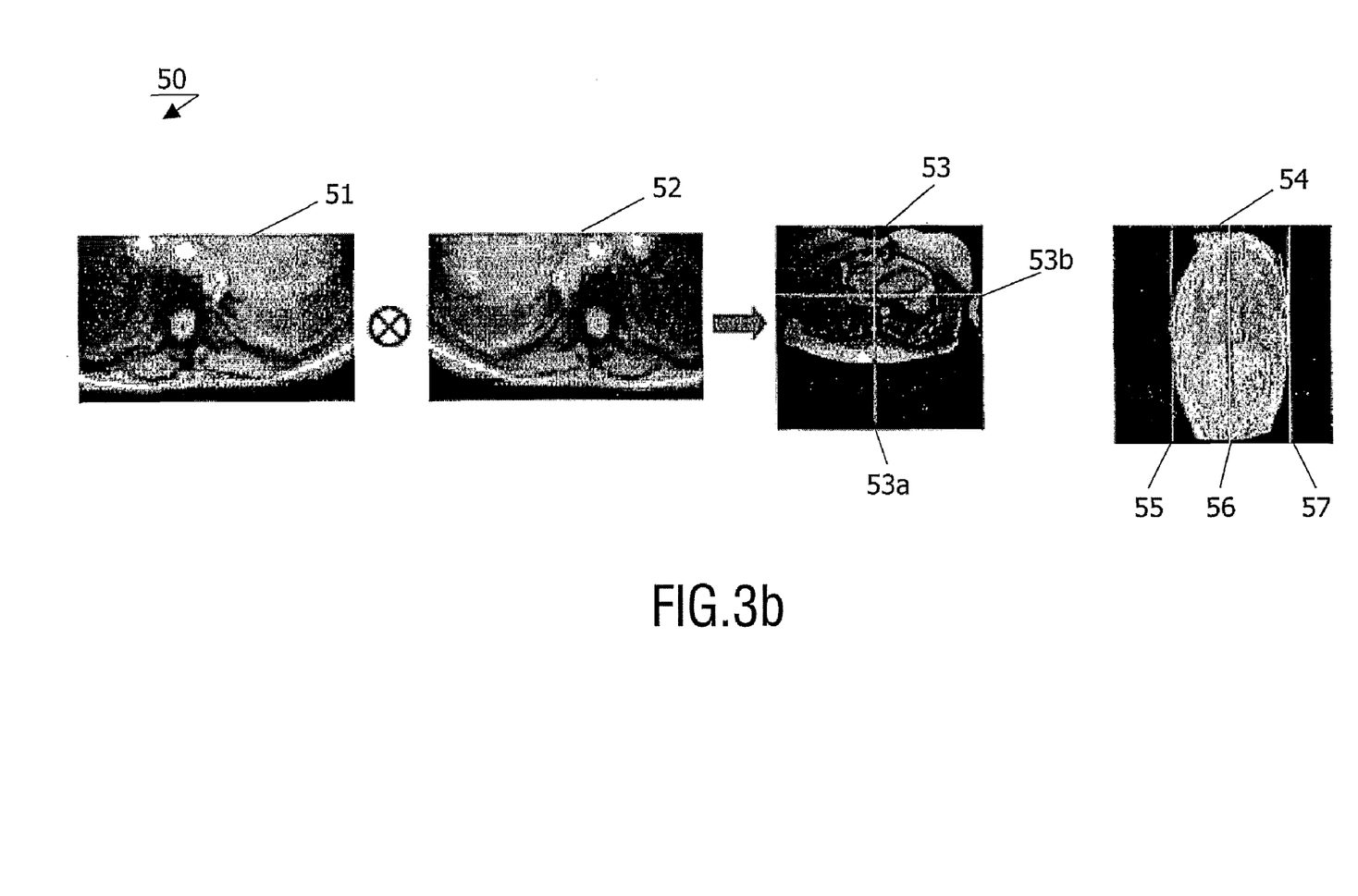
FIG. 3b presents in a schematic way a further embodiment of an operation of the recognition unit.

FIG. 3b presents in a schematic way a further embodiment of an operation of the recognition unit. In this embodiment a procedure 50 to calculate the position and orientation of the portion of the object using an object-related coordinate system is shown. In order to construct the object-oriented coordinate system, the recognition module at step 51 selects an image representative of a region of interest envisaged for a subsequent imaging using a suitable data acquisition module. At step 52 a mirrored image thereof is constructed, these images being subsequently subjected to cross-correlation processing arranged to evaluate symmetry features of the images. When the symmetry is established, at step 53 corresponding symmetry axes and/or symmetry planes 53a, 53b are identified. Based on these symmetry axes and/or symmetry planes, the position and orientation of the bounding box 55, 56, 57 is established at step 54. The position and the orientation of the bounding box is then referenced to the coordinate system of the data acquisition module, after which the actual parameters for the imaging geometry are established from default parameters and the position and the orientation of the bounding box. Although this particular embodiment is illustrated using a human heart as an example, other organs and/or portions of the body may as well be used to practice the invention.

It is noted that the definition of the bounding box and the reference points depends on the region of interest, notably an anatomical structure of a human, that has to be selected for imaging purposes. Generally, starting from the symmetry axis, reference points, reference lines or reference planes are detected by applying prior knowledge about the geometry, like shape and size thereof, and the appearance, like pixel intensity distribution or pixel gradient of the anatomical structure under consideration. For example in the foregoing, a definition of a reference point is described for a cardiac imaging. The dome of the diaphragm is a good reference point for cardiac scans. Thus, starting from the symmetry axis of the thorax the boundaries of the lungs are detected. For example, the search of boundaries may be implemented using a suitable analysis of a gradient in pixel values. Then, by fitting a suitable function, for example a parabolic to represent apexes of the lungs, the potential boundary of the lung is defined. This boundary is validated by looking into its counterpart, mirrored with reference to the established symmetry axis. In addition, by defining a bounding box the range can be cut down wherein promising boundary candidates are expected. Therefore the region around the symmetry axis is defined in accordance to the spatial resolution of the image and the prior knowledge about the size and position of a conventional lung with respect to the symmetry axis. Once the boundary of the lung has been detected and described by suitable forms, notably parabolic forms, the dome can easily be found as the minimum of the parabolic form of the lower part of the lobes of the lung. This reference point is one parameter that enables an automatic definition of cardiac scan volume.

Figure 4:
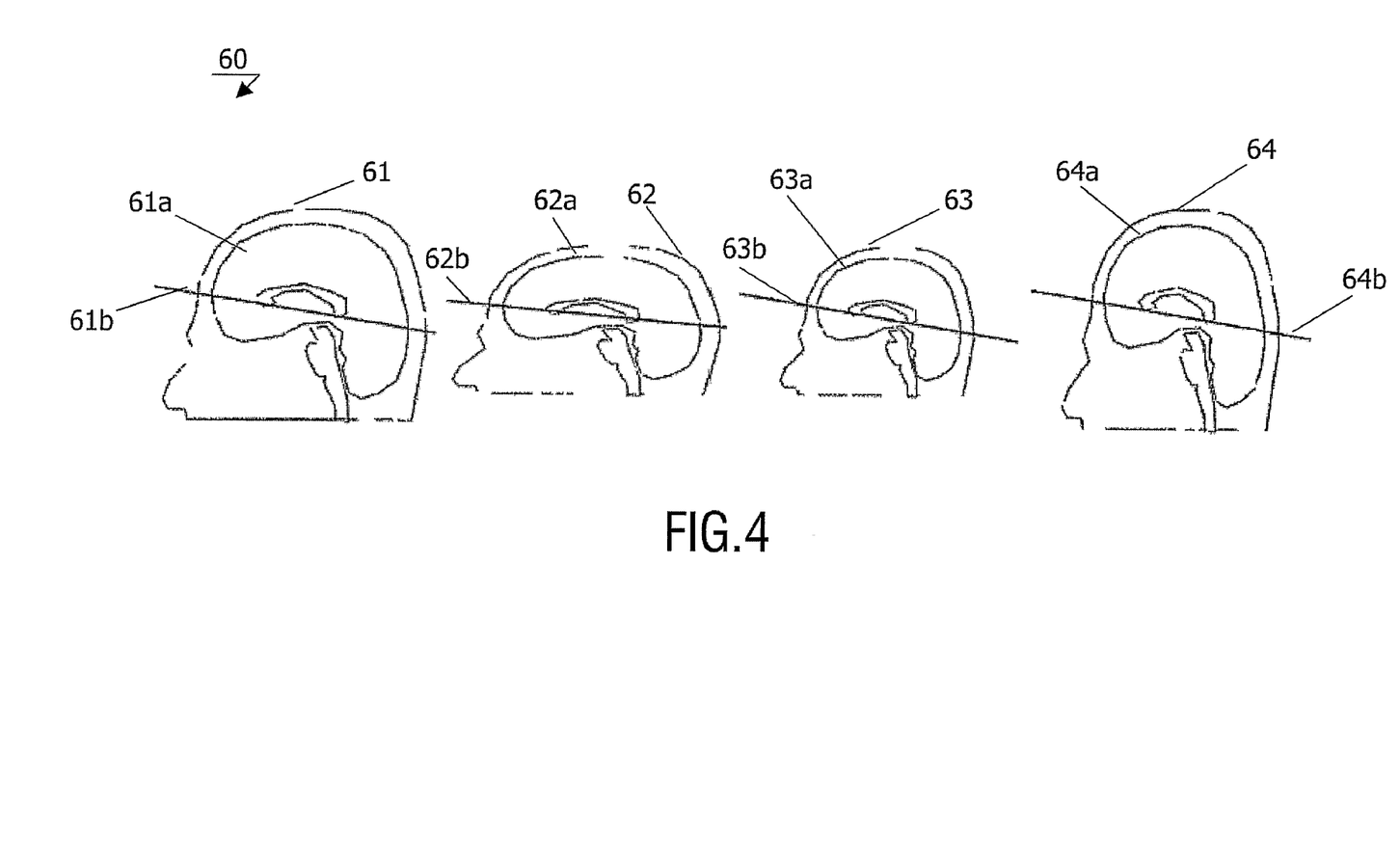
FIG. 4 presents in a schematic way a still further embodiment of an operation of the recognition unit to define the shape parameters.

FIG. 4 presents in a schematic way a still further embodiment of an operation of the recognition unit to define the shape parameters. It is found to be particularly advantageous to discriminate not only between different topologies of the region of interest, like different organs, but also to discriminate between different shapes for like topologies, for example to discriminate between differently sized organs, for example brains, hearts, lungs, eyes, etc. For this purpose the recognition module of the apparatus according to the invention is arranged to generate shape parameters of the portion of the object, whereby the control unit of the apparatus is further arranged to modify the actual parameters in accordance with these shape parameters. The procedure 60 of establishing the shape parameters is schematically illustrated in FIG. 4. Hereby, differently shaped brains 61a, 62a, 63a, 64a from different subjects 61, 62, 63, 64 are shown. As follows from this illustration, for brains with different shapes, the orientation of an imaging plane must be selected differently in order to produce anatomically similar and thus comparable image data. The recognition unit is arranged to select the default parameters of the imaging geometry, which is carried out based on a suitable criterion, like a type of the organ. From FIG. 4 it follows that some adjustment of the imaging geometry may be required for differently shaped brains. Therefore, the recognition module is arranged to define shape parameters for every brain 61a, 62, 63a, 64a. Preferably, the shape parameters describe a geometric shape representative of the region of interest. For example, the shape parameters may be arranged to geometrically describe a cross-section for the region of interest, or to fully describe the three-dimensional volume thereof.

Preferably, the shape parameters are stored in the apparatus according to the invention together with the actual parameters of the imaging geometry. This is particularly useful for planning the imaging geometry of a new shape. In this case, the recognition unit calculates the shape parameters for the new shape, then it calculates weighting factors for the already saved shape parameters, based, for example on a degree of spatial conformity between the saved shape and the new shape. After this, the recognition unit may calculate the actual parameters of the imaging geometry for the new shape based, for example on a weighted combination of the saved actual parameters for other shapes. This procedure is illustrated by way of an example with reference to FIG. 5.

Figure 5:
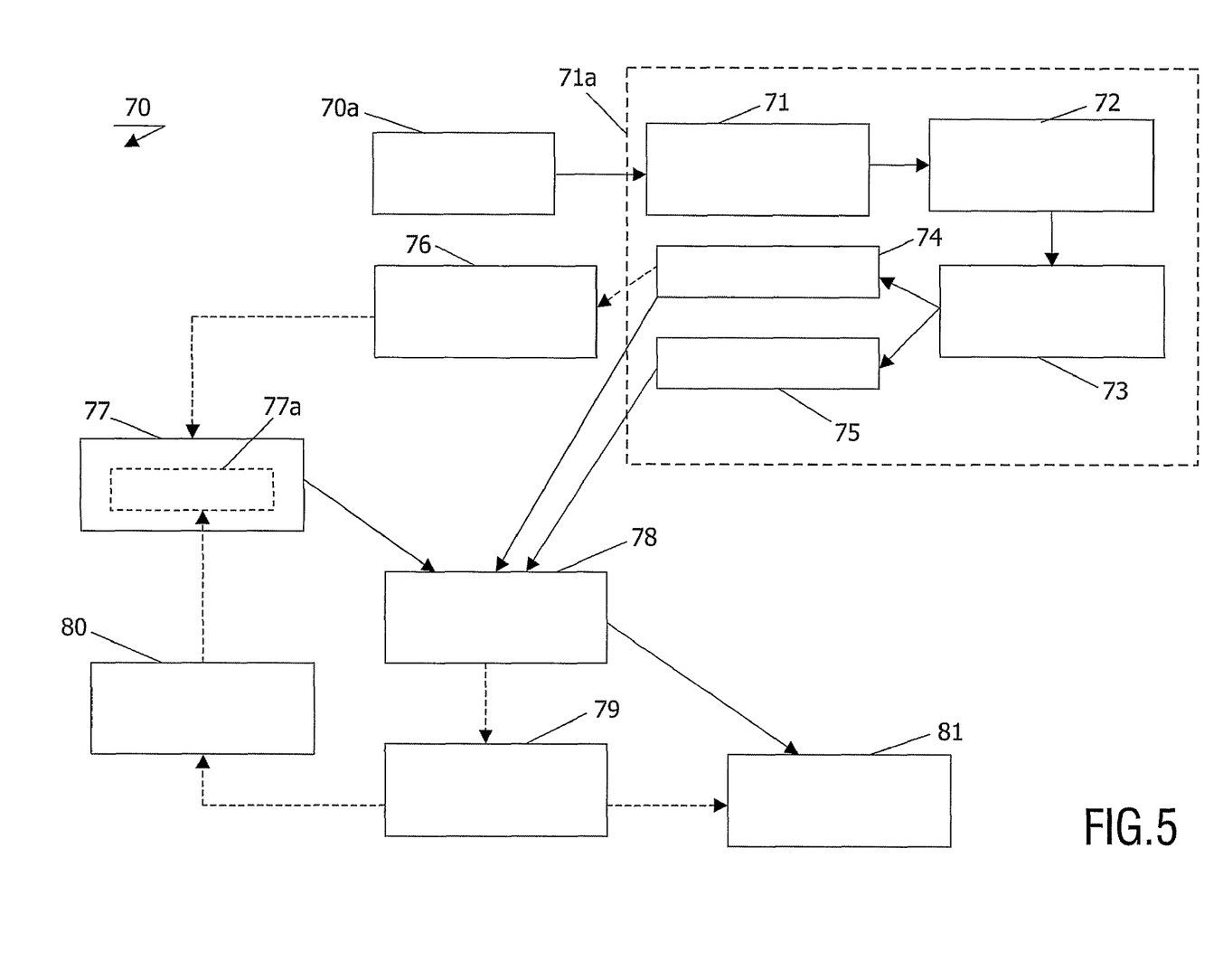
FIG. 5 presents in a schematic way an embodiment of a work-flow of the method according to the invention.

FIG. 5 presents in a schematic way an embodiment of a work-flow of the method according to the invention. According to the method 70 of the invention, at step 71a the position and the orientation of the portion of the object conceived to be imaged is established. For this purpose at step 70a an image data comprising said portion of the object is acquired or is selected using suitable respective data acquisition means. The step 71a may comprise a plurality of sub-steps. For example, at sub-step 71 the image data may be used to construct an image corresponding to a plane of symmetry of the object 72, after which the portion of the object is being automatically recognized at step 73, using for example a suitable organ recognition algorithm. When it is established what type may be assigned to the portion of the object, the position and orientation thereof is established at step 75. Additionally, at step 74 dimensions and suitable shape parameters of the portion of the object are established. At step 77 default parameters of the imaging geometry are selected, and at step 78 the actual parameters of the imaging geometry are established based on a suitable matching between the coordinate system of the default parameters and the coordinate system of the portion of the object. Preferably, a user interaction is allowed at step 79, whereby the actual imaging geometry may be adjusted. The final parameters of the imaging geometry are being output and/or stored at step 81. It is found to be particularly advantageous to feedback the user's adjustments to the planning algorithm. This may be enabled at step 80, whereby the user's adjustments to the actual parameters are being stored. Preferably, the user's adjustments are used to adapt the stored default parameters 77a, which is carried out at step 77. The suitable adaptation may take into account for example a number of user's adjustments, for example five and/or similar shape parameters, which are being selectable at step 76. In this way the procedure of automatic determination of the imaging geometry is self-learning and progressing to an educated system for an imaging geometry planning whereby user's expertise is used at its advantage.

By way of an example a procedure of the automatic planning of the imaging geometry will be illustrated based on some arbitrary values. Let us assume that:

1. The recognition algorithm has established the following parameters for the human brain, being the region of interest:
   Off-centre AP, FH, LR=20, −5, −7
   Angulation AP, FH, LR=3°, 6°, −2°
   Type of the portion=A (brain), C (shape parameter)
2. Default parameters of the imaging geometry:
   Off-centre AP, FH, LR=4, 0, 0
   Angulation AP, FH, LR=+15°, 0°, 0°
3. The recent five user adjustments for portions of type A:
   Off-center AP, FH, LR=1, 0, 0 Type=A, C: weighting factor=1.0;
   Angulation AP, FH, LR=+5°, 0°, 0°
   Off-center AP, FH, LR=2, 0, 0 Type=A, C: weighting factor=1.0;
   Angulation AP, FH, LR=+5°, 0°, 0°
   Off-center AP, FH, LR=2, 0, 0 Type=A, B: weighting factor=0.75;
   Angulation AP, FH, LR=+2°, 0°, 0°
   Off-center AP, FH, LR=3, 0, 0 Type=A, D: weighting factor=0.75;
   Angulation AP, FH, LR=+3°, 0°, 0°
   Off-center AP, FH, LR=3, 0, 0 Type=A, E: weighting factor=0.5;
   Angulation AP, FH, LR=+4°, 0°, 0°
   The average adjustment therefore equals:
   Off-center AP, FH, LR=2.1, 0, 0
   Angulation AP, FH, LR=+3.9°, 0°, 0°
4. The actual parameters of the imaging geometry are now calculated as:
   Off-centre
   AP=20+4+2.1=26.1
   FH=−5+0+0=−5
   LR=−7+0+0=−7
   Angulation
   AP=3°+15°+3.9°=21.9°
   FH=6°+0°+0°=6°
   LR=−2°+0°+0°=−2°

When the user makes adjustments, they are stored in a suitable database for portion type A, C and are available for further automatic planning of imaging geometries for portions of types A, and in particular for portions of type A, C.

The invention claimed is:

1. An apparatus arranged to determine actual parameters of an imaging geometry conceived to be used by a data acquisition module for acquisition of image data of a portion of an object, said apparatus comprising:
   a control unit arranged to select default parameters of the imaging geometry with reference to a coordinate system of the data acquisition module;
   a recognition module arranged to determine a spatial position and orientation of the portion of the object with respect to said coordinate system,
   the control unit being further arranged to automatically calculate the actual parameters of the imaging geometry based on the default parameters of the imaging geometry and the spatial position and orientation of the portion of the object,
   wherein the recognition module is further arranged to generate shape parameters of the portion of the object, the control unit being further arranged to modify the actual parameters of the imaging geometry in accordance with the shape parameters and wherein for a new shape the control unit is further arranged to assign weighting factors to different stored actual parameters representative of different shapes, based on a degree of conformity of respective shapes to a new shape, and to calculate the actual parameters for the new shape by using weighted plurality of stored actual parameters of the imaging geometry.

2. An apparatus according to claim 1, wherein the recognition module is further arranged to define an object-related coordinate system based on symmetry properties of the object, the spatial position and orientation of the portion of the object being determined from a position and an orientation of the object-related coordinate system.

3. An apparatus according to claim 1, wherein the apparatus further comprises a user interface arranged to enable an adjustment of the actual parameters of the imaging geometry by a user.

4. An apparatus according to claim 3, wherein a plurality of the adjusted actual parameters is stored in a storage unit, the control unit being further arranged to adapt the default parameters in accordance with said plurality of the adjusted actual parameters.

5. An imaging system comprising an apparatus according to claim 1 and the data acquisition module arranged to carry out an acquisition of image data of a portion of an object in accordance with the actual parameters of the imaging geometry.

* * * * *